June 16, 1925.
A. J. MACY
SEARCHLIGHT
Filed Jan. 11, 1924
1,542,259
5 Sheets-Sheet 1
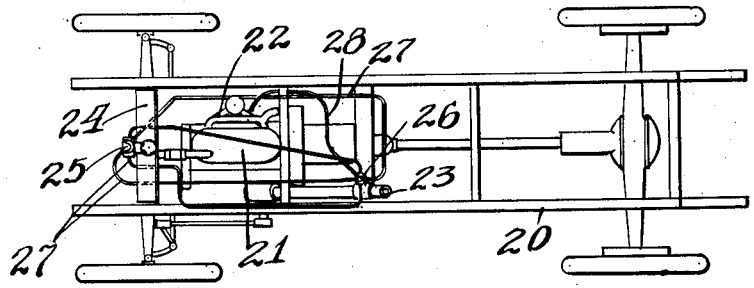
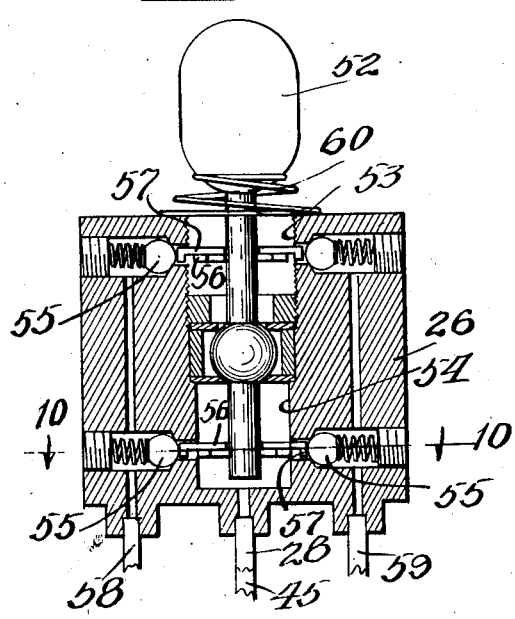
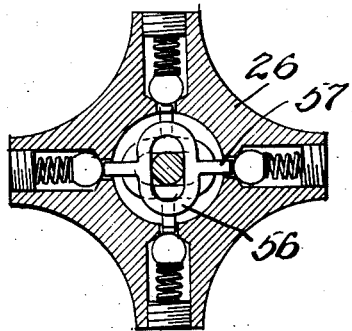
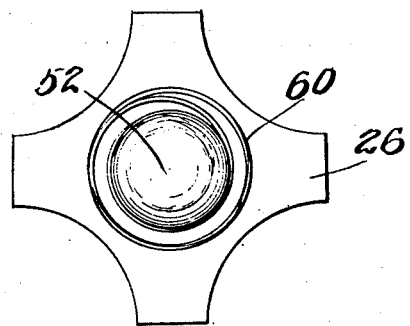
Inventor
Alfred John Macy

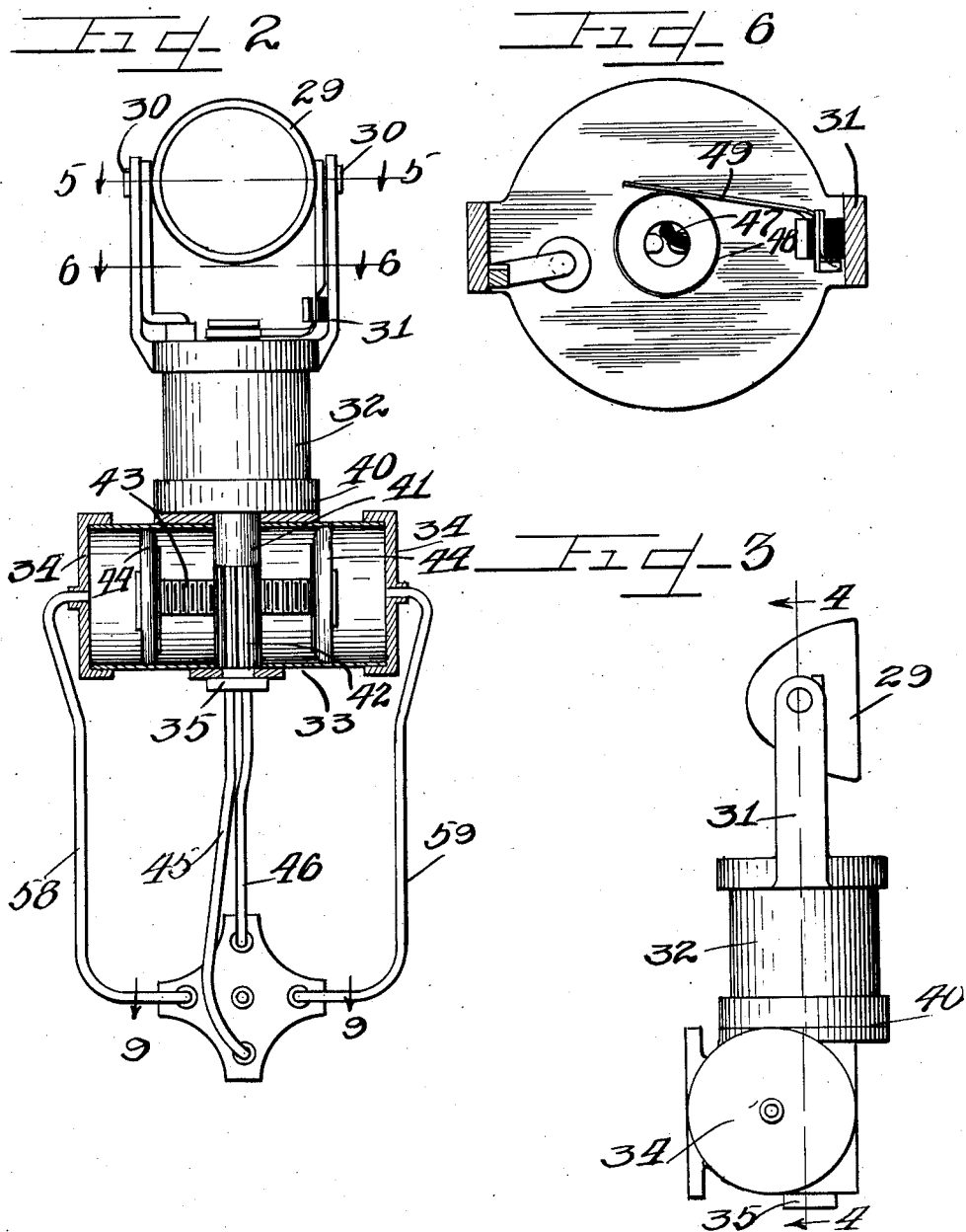

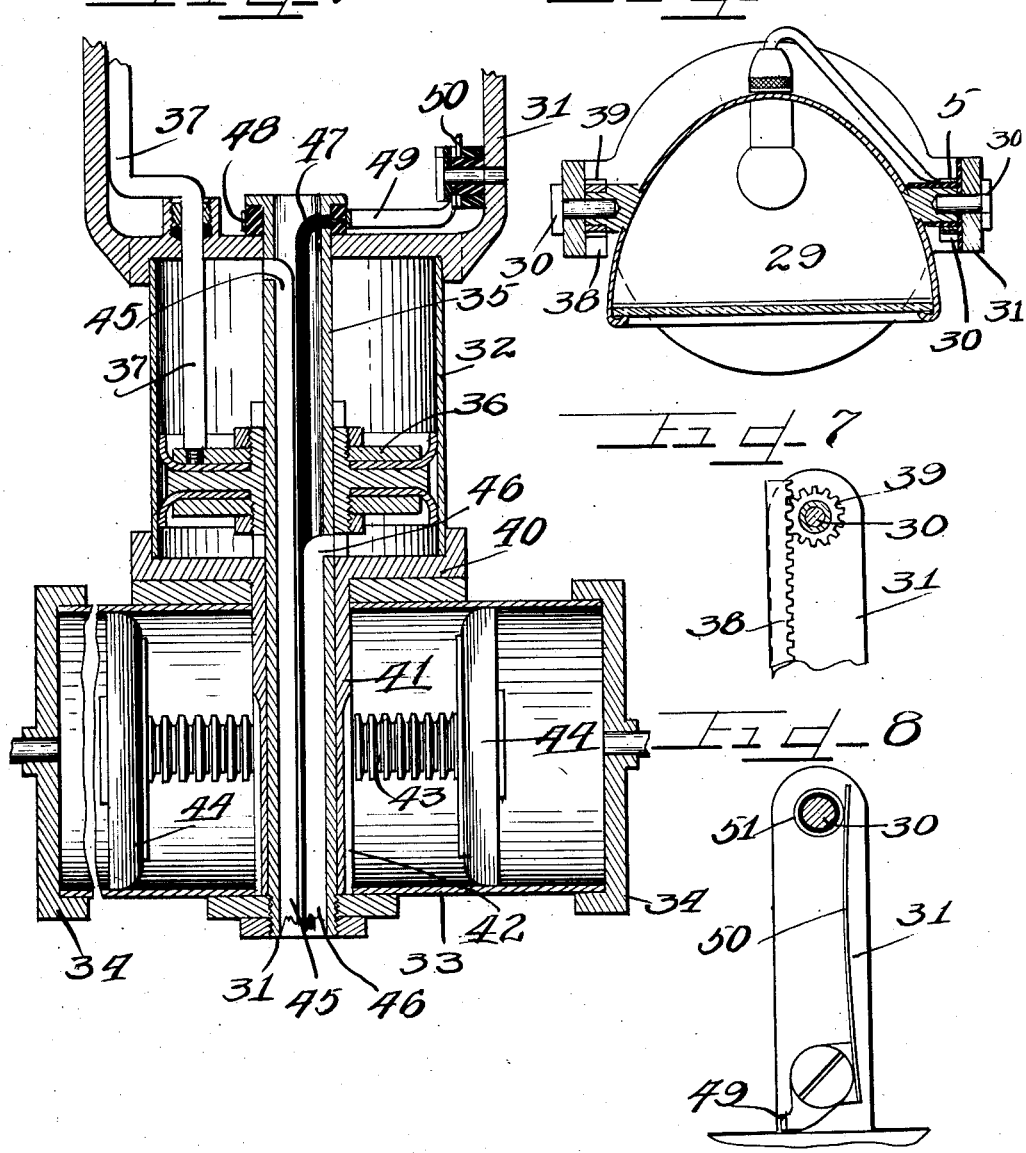

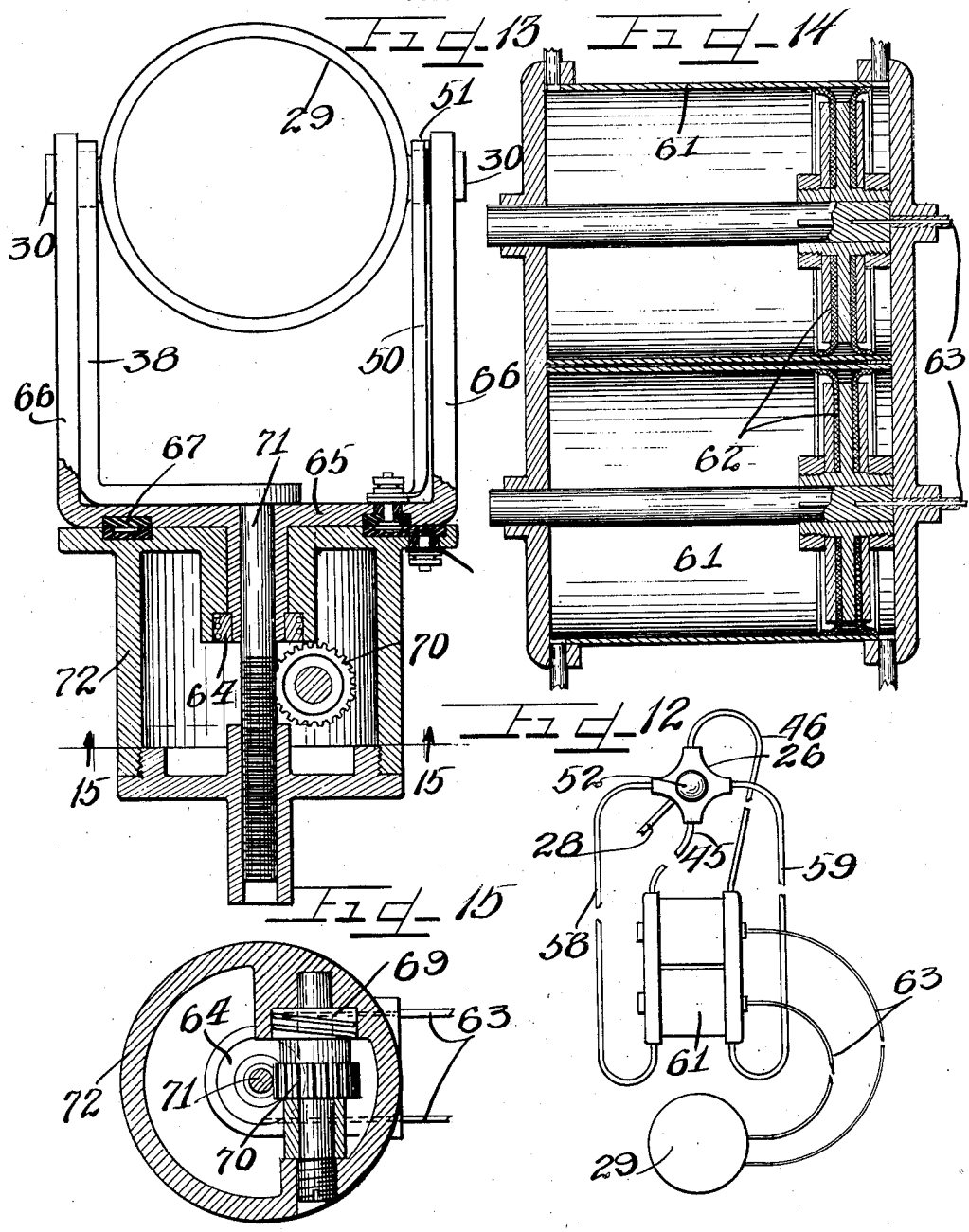

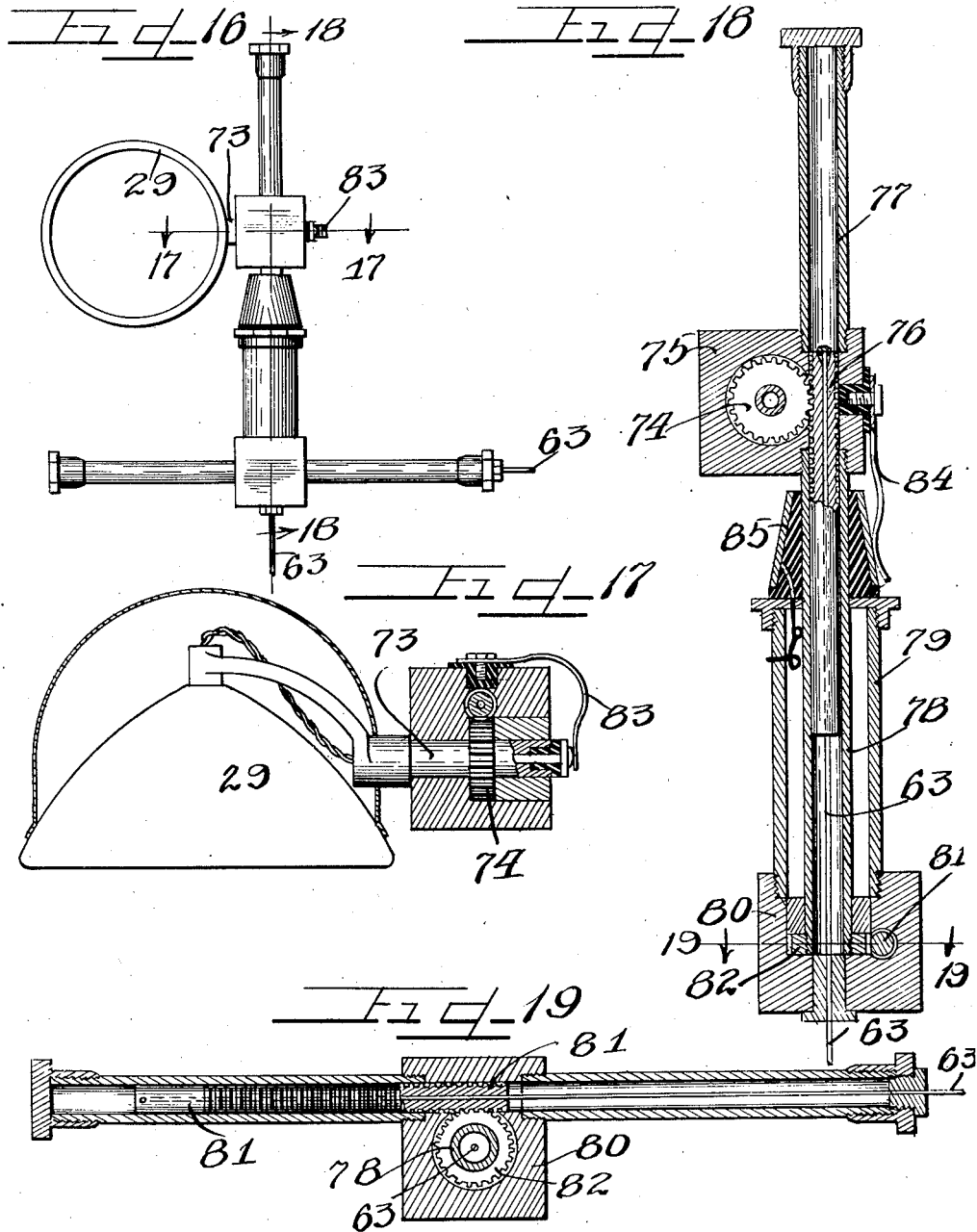

Patented June 16, 1925.

1,542,259

UNITED STATES PATENT OFFICE.

ALFRED JOHN MACY, OF CHICAGO, ILLINOIS.

SEARCHLIGHT.

Application filed January 11, 1924. Serial No. 685,497.

*To all whom it may concern:*

Be it known that I, ALFRED J. MACY, a citizen of the United States, and a resident of the city of Chicago, in the county of Cook and State of Illinois, have invented certain new and useful Improvements in a Searchlight; and I hereby declare that the following is a full, clear, and exact description of the same, reference being had to the accompanying drawings, and to the numerals of reference marked thereon, which form a part of this specification.

This invention relates to dirigible search lights or spot lights for automotive vehicles and the like whereby the direction of the beam of light may be controlled at will from the operator's position.

It is an object of this invention to eliminate direct mechanical control of a searchlight by the provision of a servo-motor operating on power derived from the prime mover of the vehicle.

It is also an object of this invention to provide a dirigible spotlight fluidly controlled from a multiple valve located conveniently to the operator's position.

It is another object of this invention to provide a disassociated spot light and operating mechanism therefor whereby the spotlight may be mounted in the most desirable position, such as on the radiator, mudguard or top of an automobile, without regard to the location of the operating mechanism which may be installed in any convenient position.

It is a further object of this invention to provide a multiple control valve, suitable for attachment to the instrument board or steering column of an automotive vehicle, that can be operated by a single lever, movement of which in one line produces tilting of a spotlight and in a line at right angles produces rotation of the spotlight, any desired combinations of these two movements being available simultaneously.

Other and further important objects of this invention will be apparent from the disclosures in the specification and accompanying drawings.

This invention (in a preferred form) is illustrated in the drawings and hereinafter more fully described.

On the drawings:

Figure 1 is a plan view of an automobile chassis with a device embodying features of this invention installed thereon.

Figure 2 is an elevation of one form of the device of this invention with some details partly in section.

Figure 3 is a side view of Figure 2 with the piping and valve omitted.

Figure 4 is an end section on the line 4—4 of Fig. 3.

Figure 5 is an end section on the line 5—5 of Fig. 2.

Figure 6 is an end section on the line 6—6 of Fig. 2.

Figure 7 is an end fragmentary detail of the left trunnion of Figure 5.

Figure 8 is an end fragmentary detail of the right trunnion of Figure 5.

Figure 9 is an end section on the line 9—9 of Fig. 2.

Figure 10 is a section on the line 10—10 of Fig. 9.

Figure 11 is a top plan view of the control valve shown in section in Figures 9 and 10.

Figure 12 is a plan view of a modified form of this invention wherein the searchlight is separate from the power operating mechanism.

Figure 13 is an enlarged elevation of the spotlight and controls of Figure 12.

Figure 14 is an enlarged section through the power cylinders of Figure 12.

Figure 15 is a section on the line 15—15 of Fig. 13.

Figure 16 discloses a variation of the basic principles as shown in Figures 12 to 15.

Figure 17 is an enlarged section on the line 17—17 of Figure 16.

Figure 18 is an enlarged section on the line 18—18 of Figure 16.

Figure 19 is an enlarged section on the line 19—19 of Figure 18.

As shown on the drawings:

Figure 1 discloses a plan view of an automobile chassis frame 20 having an internal combustion engine 21 as a power unit, an intake manifold being indicated at 22, a steering wheel column at 23 and a cooling water radiator at 24. A spotlight mechanism embodying one form of the device of this invention is shown attached to the radiator and is indicated by the numeral 25. An operating valve mechanism for the spotlight indicated by the numeral 26, is shown attached to the steering column, and various pipes 27 lead therefrom to the spotlight 25. A pipe 28 leads to the intake manifold 22, the suction created therein being utilized as the source of power for operating the spotlight.

The spotlight mechanism 25 of Figure 1 is shown in detail in Figures 2 to 8 inclusive and the valve mechanism 26 is shown in detail in Figures 9 to 11 inclusive.

A spotlight proper 29 is tiltably mounted in trunnions 30 comprising a fork like supporting frame 31 forming the cap of a vertical cylinder 32. Disposed below and slightly offset from the vertical cylinder centerline is a horizontal cylinder 33 having end closures 34. A vertical tube 35 extends centrally of the cylinder 32 and through the cylinder 33 also. A piston 36 surrounds this tube within the vertical cylinder, and is free to slide thereon under the influence of suction or pressure on either side of the piston, carrying an operating rod 37 with it which ends in a rack 38 engaging a pinion 39 on one of the trunnions 30 to tilt the spotlight. The lower end of the vertical cylinder 32 is closed by a cap 40 having a tube like extension 41 surrounding the vertical tube 35 and extending through the horizontal cylinder 33. Gear teeth 42 are milled on this extension to be engaged by a rack 43 comprising a piston rod connecting pistons 44 on either side of the vertical tube 35. Movement of these pistons rotates the extension 41 and the lower cap 40 of the vertical cylinder 32 which carries the entire spotlight proper. The vertical tube 35 carries suction or pressure pipes 45 and 46 opening into the vertical cylinder near the top and bottom thereof, and also an insulated electric conductor 47 terminating in an insulated ring 48 from which a wiper or brush 49 completes to the spotlight through a second brush 50 contacting another insulated ring 51 on the trunnion opposite the rack and pinion tilting mechanism.

The control valve mechanism 26 includes a universally mounted operating handle 52 in a central bore 53 terminating at the bottom in an attachment for the pipe 28 leading to the source of suction or pressure, as for example the intake manifold of an internal combustion engine. The universal mounting of the operating handle 52 is intended to seat air tight so that the space 54 therebelow will be under vacuum or pressure according to the source of power, the entire device being operative without change at pressures either above or below atmospheric. Disposed around the space 54 near the end of the handle 52 are four spring pressed ball valves 55 which serve as vacuum or pressure valves. A slotted member 56 engages around the end of the handle and has two diametrically opposed lugs 57 so that displacement of the member 56 in the line of the lugs will unseat one of the ball valves. A duplicate slotted member 56 is arranged at right angles to control the other two ball valves, so that whichever way the handle is moved either one or two valves are opened, establishing communication between the source of power in chamber 54 and the respective cylinder ends to which the valves are connected. In Figures 2 and 9 pipes 58 and 59 lead to the ends of the horizontal cylinders to cause rotation of the spotlight about a vertical axis.

The upper ball valves and slotted members are duplicates of the lower ones and as they are on the opposite side of the handle lever ball they are operated in opposition to the lower ball valves. The upper valves serve as air vents by means of suitable passages to the opposite side of the piston from that which is connected to the source of power. The handle 52 is normally retained in a central position by a spring 60 which is compressed by movement of the handle in any direction and therefore tends to return it to neutral.

The modifications of Figures 12 to 19 differ from the foregoing in that the spotlight and the power cylinders therefor are separated to permit greater flexibility in installation and to reduce the bulk of the visible mechanism adjacent the spotlight, thereby permitting the installation of the spotlight on a fender or the top of an automobile and placing the power operating mechanism wherever desirable within the chassis proper.

Figure 14 shows details of two side by side operating cylinders 61 and pistons 62. Each of these pistons is connected to a Bowden wire 63, one wire serving for rotation of the spotlight 29 and the other controlling the tilting. The suction or pressure piping and control valve 26 are the same as heretofore described so that the same reference numerals are applied thereto.

Figures 13 and 15 disclose one type of spotlight mechanism adapted to be operated by the Bowden wires 63. One of these wires is wound on a spool 64 which is secured to and turns a rotating member 65 carrying forks 66 for the spotlight trunnions 30. A circular insulated ring 67 and brush 68 is provided to make electrical contact for the spotlight bulb, during rotation of the spotlight. The previously described brush 50 and ring 51 being used at one trunnion to allow tilting the spotlight. The spotlight tilting mechanism comprises a duplicate spool 69 for the other Bowden wire 63 which turns a small pinion 70 meshing with a vertical rock shaft 71 journalled in a body 72 for the mechanism and terminating in the previously described rack 38 and pinion 39 on the trunnion 30 of the spotlight. By pulling the Bowden wire 63 the vertical rack shaft 71 is elevated carrying the rack 38 with it and thereby tilting the spotlight about the trunnions 30.

An alternative arrangement is shown in Figures 16 to 19 wherein the spotlight 29 is mounted on a horizontal rotating or tilting shaft 73 carrying a pinion 74 and journaled in the block 75 apertured for a vertical rack shaft 76 to which one Bowden wire 63 is attached. This rack shaft 76 is enclosed in tubes 77 and 78, the latter tube being rotatable within a stationary larger tube 79 supported on a block 80 which is apertured for a second horizontal rack shaft 81 which engages a pinion 82 on the end of the tube 78 to rotate the tube and thereby rotate the spotlight about a vertical axis by means of movement of the rack shaft 81 due to the second Bowden wire secured therein. Suitable continuous electrical contact devices are provided comprising brushes 83 and 84 and insulated on ring 85.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A searchlight control comprising suction actuated pistons adapted to cause movement of said searchlight about two axes and a single universally mounted operating valve handle adapted to control the movement of said pistons singly or simultaneously according to the direction of movement of said handle.

2. An adjustable spotlight comprising fluid motors for rotating and tilting said spotlight, multiple fluid valves controlling the admission and exhaust of fluid to and from said fluid motors, and a single universally mounted operating handle adapted to selectively and simultaneously operate pairs of admission and exhaust valves for the fluid motors.

3. A tiltable spotlight, a rotatable supporting member therefor, mechanism in said supporting member for tilting said spotlight, a second stationary supporting member, and mechanism therein for rotating said first mentioned support.

4. In combination with a dirigible spot lamp and fluid operated means for moving said lamp about two axes, a control valve for the fluid comprising a casing having a plurality of normally seated valves in two groups adapted to control the admission and exhaust of fluid from said operating means, a handle universally mounted between said groups of valves and means actuable by said handle adapted to selectively control the opening of said valves.

5. In combination with a movable spotlight, fluid motors adapted to traverse and elevate said spotlight, and a control valve therefor comprising a casing having groups of admission and exhaust valves for said fluid motors and operating means therefor fulcrumed between the groups of valves whereby one or more admission and exhaust valves will be simultaneously operated by a movement of the operating means.

6. In combination with a fluid actuated dirigible spotlight, a control valve for the fluid comprising a casing having admission and exhaust valves for the fluid and an operating handle universally mounted to actuate a plurality of pairs of admission and exhaust valves simultaneously.

7. In combination a dirigible spotlight, fluid operating mechanism therefor and means controlling the operating mechanism comprising a casing having a plurality of valves for directing the application of the fluid and means adapted to simultaneously control a plurality of said valves.

In testimony whereof I have hereunto subscribed my name in the presence of two subscribing witnesses.

ALFRED JOHN MACY.

Witnesses:
CARLTON HILL,
OSCAR HARTMANN.